(12) United States Patent
Cope et al.

(10) Patent No.: US 12,353,289 B2
(45) Date of Patent: Jul. 8, 2025

(54) DIRECT-TO-CLOUD BACKUP WITH LOCAL VOLUME FAILOVER

(71) Applicant: KASEYA US LLC, Miami, FL (US)

(72) Inventors: Andrew Cope, Rochester, NY (US); Robert Loce, Webster, NY (US)

(73) Assignee: KASEYA US LLC, Miami, FL (US)

( * ) Notice: Subject to any disclaimer, the term of this patent is extended or adjusted under 35 U.S.C. 154(b) by 169 days.

(21) Appl. No.: 16/680,753

(22) Filed: Nov. 12, 2019

(65) Prior Publication Data

US 2021/0141694 A1    May 13, 2021

(51) Int. Cl.
*G06F 11/14* (2006.01)

(52) U.S. Cl.
CPC ...... *G06F 11/1451* (2013.01); *G06F 11/1464* (2013.01); *G06F 2201/84* (2013.01)

(58) Field of Classification Search
CPC ............. G06F 11/1451; G06F 11/1464; G06F 2201/84
See application file for complete search history.

(56) References Cited

U.S. PATENT DOCUMENTS

| | | |
|---|---|---|
| 6,674,447 B1 * | 1/2004 | Chiang .................. G06F 16/70 715/704 |
| 7,246,207 B2 | 7/2007 | Kottomtharayil et al. |
| 8,782,005 B2 | 7/2014 | Barnes et al. |
| 8,799,245 B2 | 8/2014 | Amarendran et al. |
| 8,805,806 B2 | 8/2014 | Amarendran et al. |
| 9,152,507 B1 | 10/2015 | Bushman |
| 9,229,818 B2 | 1/2016 | Doshi et al. |
| 9,317,376 B1 | 4/2016 | Bushman |
| 9,563,633 B1 | 2/2017 | Bushman et al. |
| 9,645,891 B2 | 5/2017 | Ahn et al. |
| 9,703,644 B1 | 7/2017 | Jagannath et al. |
| 9,740,569 B2 | 8/2017 | Bushman |
| 9,811,422 B2 | 11/2017 | Bushman |
| 10,061,664 B2 | 8/2018 | Verkaik et al. |

(Continued)

OTHER PUBLICATIONS

Unpublished U.S. Appl. No. 16/391,205 by Mark filed Apr. 22, 2019, and entitled "Source Volume Backup With Adaptive Finalization Apparatuses, Methods and Systems".

(Continued)

*Primary Examiner* — Tony Wu
(74) *Attorney, Agent, or Firm* — MASCHOFF BRENNAN

(57) ABSTRACT

The disclosure provides methods and systems for direct-to-cloud backup with local volume failover. According to an exemplary embodiment, first and second logical volumes are designated on a protected computing device. The first and second logical volumes may be paired to a cloud storage facility. In response to a received signal, it may be determined if the protected computing device has a communication connection to the cloud storage facility. If the protected computing device does have a communication connection to the cloud storage facility, a first computing device backup of the first logical volume may be sent to the cloud storage facility. If the protected computing device does not have a communication connection to the cloud storage facility, a second computing device backup of the first logical volume may be performed and stored on the second logical volume of the protected computing device.

17 Claims, 8 Drawing Sheets

(56) References Cited

U.S. PATENT DOCUMENTS

| | | | |
|---|---|---|---|
| 10,838,912 B1* | 11/2020 | Chopra | G06F 11/1451 |
| 2013/0191347 A1* | 7/2013 | Bensinger | G06F 11/1464 |
| | | | 707/649 |
| 2014/0164330 A1 | 6/2014 | Barnes et al. | |
| 2015/0227602 A1* | 8/2015 | Ramu | G06F 16/2365 |
| | | | 707/634 |
| 2015/0286535 A1* | 10/2015 | Kushwah | G06F 11/1451 |
| | | | 707/646 |
| 2016/0070621 A1 | 3/2016 | Bushman | |
| 2016/0080492 A1* | 3/2016 | Cheung | H04L 67/1097 |
| | | | 709/204 |
| 2016/0124814 A1* | 5/2016 | Joseph | G06F 3/0682 |
| | | | 714/19 |
| 2016/0162364 A1 | 6/2016 | Mutha et al. | |
| 2016/0162374 A1 | 6/2016 | Mutha et al. | |
| 2017/0161163 A1 | 6/2017 | Gadish et al. | |
| 2017/0286232 A1 | 10/2017 | Bushman et al. | |
| 2017/0317932 A1* | 11/2017 | Paramasivam | H04L 47/125 |
| 2018/0006870 A1 | 1/2018 | McChord et al. | |
| 2018/0088825 A1 | 3/2018 | Mutha et al. | |
| 2019/0042373 A1 | 2/2019 | Mark | |
| 2019/0250995 A1 | 8/2019 | Mark | |
| 2020/0150897 A1* | 5/2020 | Guturi | G06F 3/0659 |

OTHER PUBLICATIONS

Unpublished U.S. Appl. No. 15/996,103 by Heckel et al., filed Jun. 1, 2018, and entitled "Systems, Methods and Computer Readable Media for Business Continuity and Disaster Recovery (BCDR)".

Unpublished U.S. Appl. No. 16/402,949 by Stuart Mark filed May 3, 2019, and entitled "Methods and Systems to Track Kernel Calls Using a Disassembler".

* cited by examiner

DIRECT-TO-CLOUD BACKUP WITH LOCAL VOLUME FAILOVER

INCORPORATION BY REFERENCE

U.S. Pat. No. 9,703,644 by Jagannatha et at., issued Jul. 11, 2017 and entitled "METHODS FOR GENERATING A SYNTHETIC BACKUP AND FOR CONSOLIDATING A CHAIN OF BACKUPS INDEPENDENT OF ENDIANNESS";

U.S. Patent Publication No. 2019/0042373A1 by Mark, published on Feb. 7, 2019, and entitled "SYSTEMS AND METHODS FOR COPYING AN OPERATING SOURCE VOLUME";

U.S. patent application Ser. No. 16/391,205 by Mark filed Apr. 22, 2019, and entitled "SOURCE VOLUME BACKUP WITH ADAPTIVE FINALIZATION APPARATUSES, METHODS AND SYSTEMS";

U.S. patent application Ser. No. 16/391,243 by Mark filed Apr. 22, 2019, and entitled "SOURCE VOLUME BACKUP WITH PREDICTIVE AND LOOKAHEAD OPTIMIZATIONS APPARATUSES, METHODS AND SYSTEMS";

U.S. patent application Ser. No. 15/996,103 by Heckel et al., filed Jun. 1, 2018, and entitled "SYSTEMS, METHODS AND COMPUTER READABLE MEDIA FOR BUSINESS CONTINUITY AND DISASTER RECOVERY (BCDR)";

U.S. Pat. No. 10,061,664 by Verkaik et al., issued on Aug. 28, 2018 and entitled "HIGH AVAILABILITY AND FAILOVER";

U.S. Patent Publication No. 2017/0161163 by Gadish et al., published on Jun. 8, 2017, and entitled "SYSTEM AND METHOD FOR PROVIDING FAILOVERS FOR A CLOUD-BASED COMPUTING ENVIRONMENT";

U.S. Pat. No. 9,740,569 by Bushman, issued on Aug. 22, 2017 and entitled "HEAD START POPULATION OF AN IMAGE BACKUP";

U.S. Pat. No. 9,317,376 by Bushman, issued on Apr. 19, 2016 and entitled "HEAD START POPULATION OF AN IMAGE BACKUP";

U.S. Pat. No. 9,811,422 by Bushman, issued on Nov. 7, 2017 and entitled "HEAD START POPULATION OF AN IMAGE BACKUP";

U.S. patent application Ser. No. 16/402,949 by Stuart Mark filed May 3, 2019, and entitled "METHODS AND SYSTEMS TO TRACK KERNEL CALLS USING A DISASSEMBLER";

U.S. Pat. No. 9,645,891 by Ahn et al., issued May 9, 2017 and entitled "OPPORTUNISTIC EXECUTION OF SECONDARY COPY OPERATIONS";

U.S. Pat. No. 7,246,207 by Kottomtharayil et al., issued on Jul. 17, 2007 and entitled "SYSTEM AND METHOD FOR DYNAMICALLY PERFORMING STORAGE OPERATIONS IN A COMPUTER NETWORK";

U.S. Pat. No. 9,229,818 by Doshi et al., issued on Jan. 5, 2016 and entitled "ADAPTIVE RETENTION FOR BACKUP DATA";

U.S. Patent Publication No. 2016/0162374 by Mutha et al., published on Jun. 9, 2016 and entitled "SECONDARY STORAGE EDITOR";

U.S. Patent Publication No. 2018/0088825 by Mutha et al., published on Mar. 29, 2018 and entitled "DEFENSIBLE PRUNING";

U.S. Patent Publication No. 2016/0162364 by Mutha et al., published on Jun. 9, 2016 and entitled "SECONDARY STORAGE PRUNING";

U.S. Pat. No. 8,805,806 by Amarendran et al., issued on Aug. 12, 2014 and entitled "AUTOMATED, TIERED DATA RETENTION";

U.S. Pat. No. 8,799,245 by Amarendran et al., issued on Aug. 5, 2014 and entitled "AUTOMATED, TIERED DATA RETENTION".

U.S. Patent Publication No. 2018/0006870 by McChord, published on Jan. 4, 2018 and entitled "REMOTELY CONFIGURABLE ROUTERS WITH FAILOVER FEATURES, AND METHODS AND APPARATUS FOR RELIABLE WEB-BASED ADMINISTRATION OF SAME".

BACKGROUND

The present disclosure generally addresses computing device backup system and methods, and more particularly, relates to DIRECT-TO-CLOUD BACKUP WITH LOCAL VOLUME FAILOVER.

This disclosure, and the embodiments described herein provide for local storage of computing device backups when communication to a cloud facility is interrupted and/or unavailable.

BRIEF DESCRIPTION

In one embodiment of this disclosure, described is system for storing computing device backups, the computing device backups being image-based backups configured to be stored at a cloud storage facility comprising at least one storage server, the cloud storage facility configured to form a local backup chain partition of the computing device backups, the system comprising a backup agent on a first logical volume of a protected computing device, the first logical volume comprising an operating system of the protected computing device, the backup agent configured to: designate a second logical volume on the protected computing device; pair the first and second logical volumes to the cloud storage facility; receive a signal to perform a computing device backup of the protected computing device; in response to the received signal, determine if the protected computing device has a communication connection to the cloud storage facility; if the protected computing device does have a communication connection to the cloud storage facility, perform a first computing device backup of the first logical volume including sending the computing device backup to the cloud storage facility; and if the protected computing device does not have a communication connection to the cloud storage facility, perform a second computing device backup of the first logical volume and store the second computing device backup on the second logical volume of the protected computing device, the second computing device backup configured to be merged with the local backup chain partition.

In another embodiment of this disclosure, described is a processor implemented method for storing computing device backups of a protected computing device, the computing device backups being image-based backups, the protected computing device comprising a first logical volume and a second logical volume, the first logical volume comprising an operating system of the protected computing device, the computing device backups configured to be stored at a cloud storage facility comprising at least one storage server, the cloud storage facility configured to form a local backup chain partition of the computing device backups, the method comprising: pairing the first and second logical volumes to the cloud storage facility; receiving a signal to perform a computing device backup of the protected computing device; determining that the protected computing device does not have a communication connection to the cloud storage facility; in response to the determination that the protected computing device does not have a communication connection to the cloud storage facility, performing a computing device backup of the first logical volume and storing the computing device backup on the second logical volume of the protected computing device; determining that the protected computing device does have a communication connection to the cloud storage facility; and in response to the determination that the protected computing device does have a communication connection to the cloud storage facility, sending the computing device backup to the cloud storage facility to merge with the local backup chain partition.

In still another embodiment of this disclosure, described is a protected computing device comprising: at least one processor; and at least one memory including computing program code; the at least one memory and the computing program code configured to, with the at least one processor, cause the protected computing device to: pair first and second logical volumes of the protected computing device to a cloud storage facility, wherein the first logical volume comprises an operating system of the protected computing device; receive a signal to perform a computing device backup of the protected computing device; in response to the received signal, determine if the protected computing device has a communication connection to the cloud storage facility; if the protected computing device does have a communication connection to the cloud storage facility, perform a first computing device backup of the first logical volume and send the computing device backup to the cloud storage facility; and if the protected computing device does not have a communication connection to the cloud storage facility, perform a second computing device backup of the first logical volume and store the second computing device backup on the second logical volume of the protected computing device; wherein the cloud storage facility is configured to form a local backup chain partition of the computing device backups.

DETAILED DESCRIPTION

In today's environment, a robust data backup system is important to many companies and businesses. Particularly, losing critical data can be detrimental or even fatal to many companies. In a typical backup storage system, backups of data are sent from a protected computing device (e.g., a device that is having data backed up such as a server, laptop, client computer, smart phone or so forth) to cloud storage over the internet. However, if the protected device loses connectivity to the internet, it is unable to send the data backups to the cloud storage.

Figure 1:
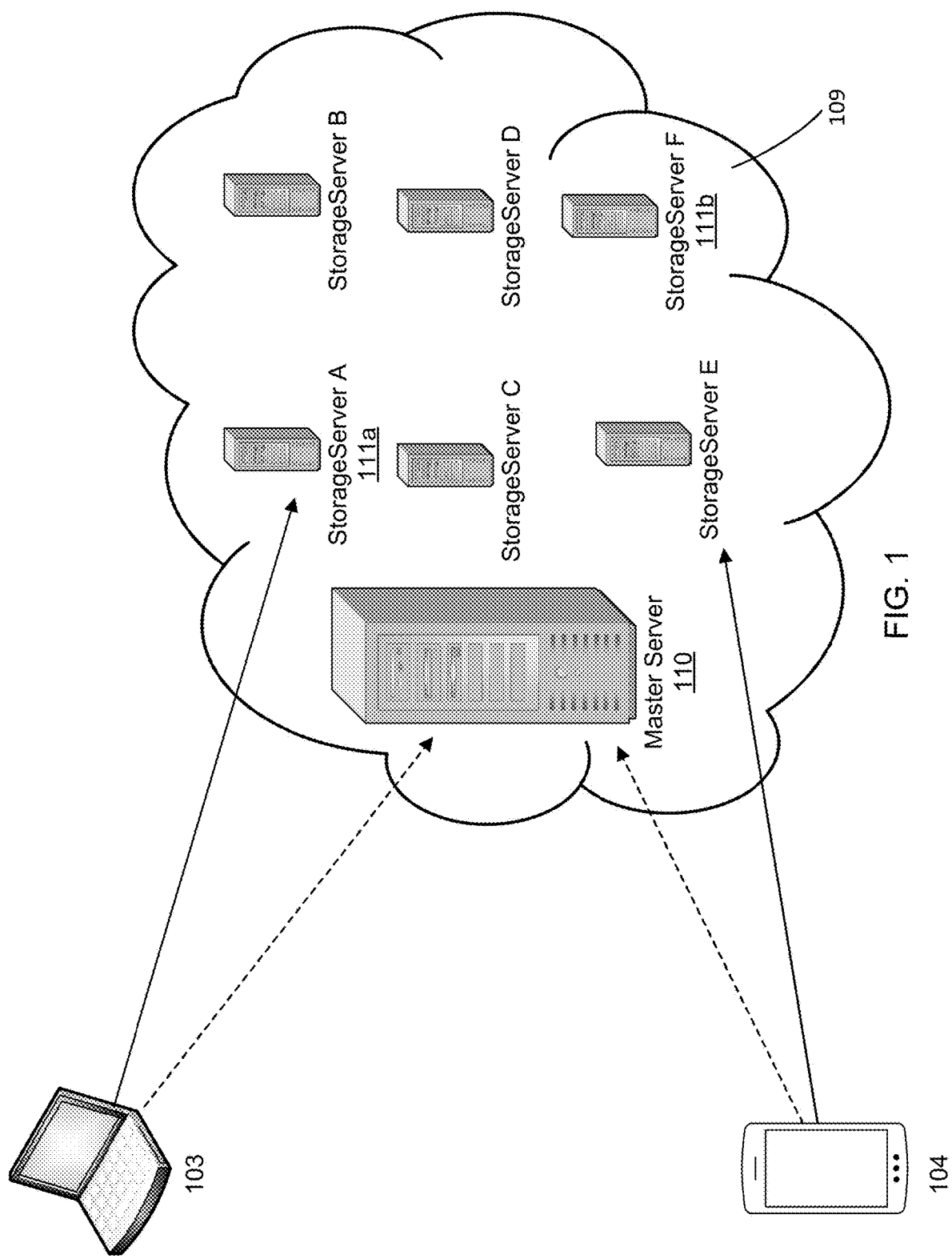
FIG. 1 shows a block diagram of a direct-to-cloud (DTC) backup network system according to an exemplary embodiment of this disclosure. This exemplary system is configured to implement methods of, for example, DTC data backup with local volume failover.

The present disclosure addresses the above-mentioned problem and others. In this regard, FIG. 1 illustrates one exemplary backup system according to this disclosure. As shown in FIG. 1, client devices (e.g., protected devices such as smartphones, servers, workstations, laptops, and/or the like) 103, 104, are in communication with cloud storage center 109 and periodically transfer a backup in the form of a snapshot to the cloud storage center 109. The snapshot operation is protected-device specific, such as for example a local backup snapshot policy that generates hourly backups for a mission-critical protected device while only generating daily snapshots of image backup files from another less critical protected device.

The master server 110 receives snapshots from the protected devices 103, 104. Alternatively, a storage server, for example StorageServer A 111a, is directly paired with the protected computing devices 103, 104 such that it is capable of receiving and applying to its own snapshot capable file system a received send file representing the file system differences between image-based file backups snapshotted at two different points in time. It should be understood that the master server 110 and the StorageServers A-F 111a, 111b may also be referred to as backup computing devices.

In some exemplary embodiments, each client device (e.g., 103, 104) comprises a backup agent 206 installed thereon to perform a backup or copying procedure. When the client device runs its backup agent, the backup agent generates and sends periodic backup files to a cloud storage facility 109. A periodic backup file, in some exemplary embodiments, comprises an image-based backup. An image-based backup is a block-by-block copy of a portion of a hard drive or logical volume. According to some exemplary embodiments, the image-based backup is of the allocated portion of a partially allocated hard drive or logical volume or a portion thereof. According to some embodiments, the image-based backup is of portions of a hard drive or logical volume that are selected by a user or system operator. According other embodiments, the image-based backup is of a full hard drive or logical volume. A block refers to a specific physical area on a hard drive, or a specific subset of a logical volume, which may contain data. In some embodiments, a block (sometimes called a physical record) comprises a sequence of bytes or bits, having a specific length called the block size. Therefore, an image-based backup represents the contents of a source hard drive or logical volume, exactly as this content was stored on the source hard drive or logical volume at a single point in time. This data includes data associated with an operating system, and data stored in the system along with structural information and application configurations. The source used to create the image backup file need not actually be a physical hard drive and may, for example, be a virtual hard disk or even another image backup file. Some exemplary embodiments described herein are utilized on backup files that are based on a different formatting scheme but otherwise lend themselves to processing by the described embodiments of the backup network. Once generated, block-level image backup files may serve as the basis for restoring a hard drive or logical volume to a substantially similar state as present at the time of the backup, in particular, at the time of entering the CoW mode. Image backup files may contain additional data elements such as file system metadata that was present on the source hard drive or logical volume, master boot records, partition information and/or the like. This manner of backup is distinguished from what may be thought of as a "file/directory level" backup which merely duplicates the contents and location of files and/or directories contained on a hard drive without necessarily including additional metadata, file system data, etc.

Furthermore, in some embodiments, the master server 110 directs the activity of the protected computing devices 103, 104, as well as manage or direct the pairing of the protected computing devices 103, 104 with different storage server nodes (e.g., StorageServers A-F, 111A, 111B) within cloud storage center 109.

In addition, in some embodiments, different types of backups are performed. For example, different types of backups include: full, incremental, and differential. As used herein, unless the type of backup (full, incremental, or differential) is specified, a "backup" may refer to any of a full backup, an incremental backup, a differential backup, or any other type of backup whether or not that type of backup is described in this disclosure.

Full backups make a complete copy of all data. Advantageously, a full backup leads to a minimal time to restore data. However, a drawback of a full backup is that it takes longer to perform a full backup than other types of backups, and further requires more storage space.

An incremental backup is a backup that copies only the data that has changed since the last backup of any type (e.g., full, incremental, or differential). A modified time stamp on files is sometimes compared to a time stamp of the last backup. In this way, backup applications track and record the date and time that backups occur in order to track files modified since these backups. An incremental backup only copies data since the last backup of any type. A benefit of an incremental backup is that it copies a smaller amount of data than a full backup, and therefore the incremental backup completes faster and requires less storage space.

A differential backup, the first time it is performed, copies all data changed from the previous backup. In this way, the differential backup is similar to the incremental backup. However, each subsequent differential backup copies all data changed since the previous full backup. The subsequent differential backups accordingly store more data than incremental backups, although the subsequent differential backups typically still store far less than a full backup. Therefore, differential backups require more storage space and time to complete than incremental backups, but less than full backups.

In some embodiments, a backup schedule includes times when these different types of backups are performed. For instance, a full backup is performed once in the evening, and incremental backups or differential backups are taken hourly. In another example, full backups are taken weekly and incremental backups or differential backups are taken daily. However, certain risk factors can contribute to unreliable data backup. For example, a system being offline could lead to an extended period of no backup, resulting in little data history, which may be problematic if a restore is needed (e.g., it is not reliable to depend on one backup snapshot or one backup of files). In another example, a system's location can affect reliability. For example, hotel Wi-Fi could be poor leading to no signal or poor signal so that, during backup, transmission to a data repository is compromised and the data backup could be corrupted. Furthermore, a poor Wi-Fi connection (or poor connection through cellular communication, blue tooth, etc.) can lead to less frequent backup, which leads to fewer recovery points, which is less robust than having the nominal number of recovery points. In yet another example, the physical or environmental conditions such as power fluctuation, room/equipment temperature, humidity, vibration, weather forecast (e.g., lightning, high winds, heavy rain), and nearby construction can affect reliability. For example, these conditions can corrupt a transmitted backup.

To further explain, reliability of direct-to-cloud backup of a computing device is dependent on connection of that device to the Internet and ultimately to cloud storage and the backup service provider. The connection may be absent or fail for a variety of reasons, such as connection is not enabled on the device while traveling (e.g., laptop) or there is a problem with transmission. Backup at scheduled or chosen times will not happen when the connection is absent and there is risk of data loss if data is accidentally deleted or something causes data to become corrupted. Viruses, physical damage or formatting errors can render data unreadable by both humans and software.

Figure 2:
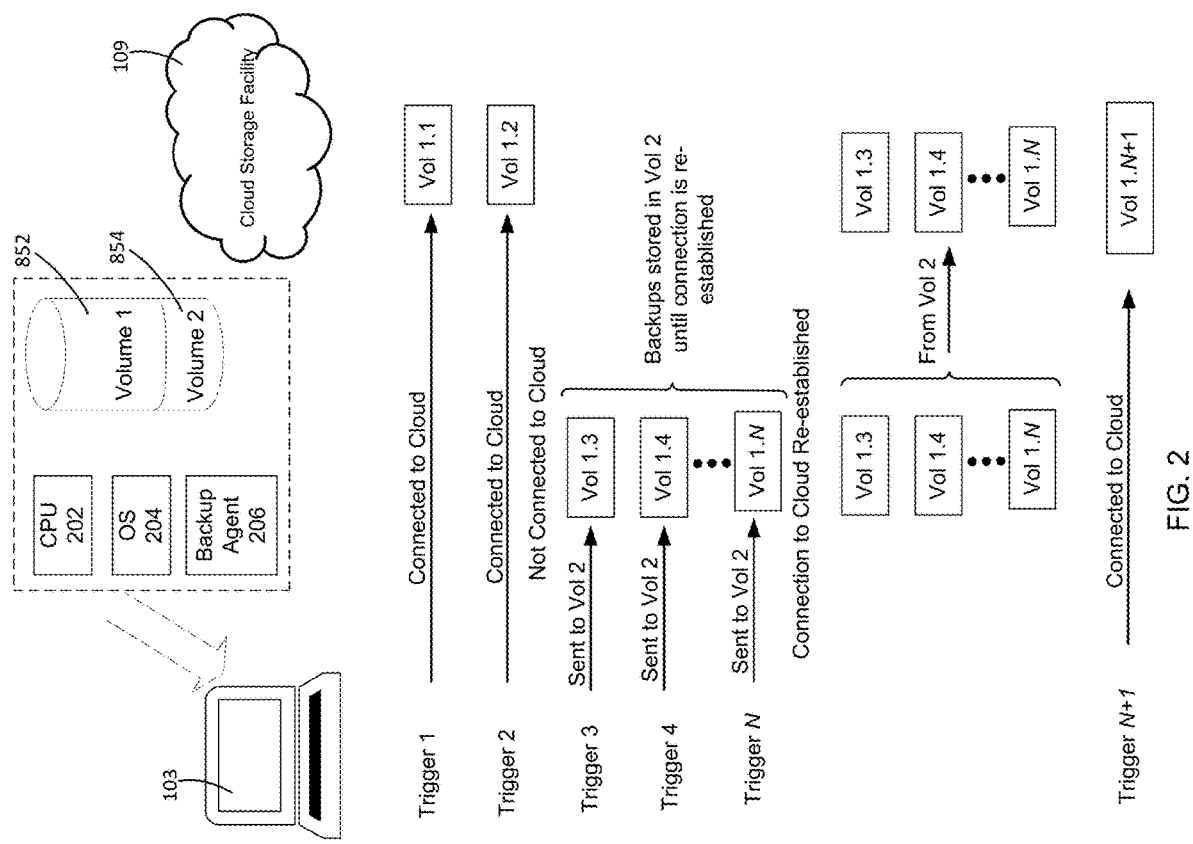
FIG. 2 illustrates a system diagram of an exemplary embodiment of the DTC failover process including backups stored in Volume 2 until a connection from the protected computing device to the cloud storage facility is reestablished.

The systems and methods of data backup disclosed herein are used to create robustness in a process for backing up a computing device by handling the situation where a protected device has lost connectivity to the internet. In some embodiments, as shown in FIG. 2, protected computing device 103, 104 includes central processing unit (CPU) 202, operating system (OS) 204, and backup agent 206. The backup agent 206 allows an operator to back up the operating system drive, for example, but not limited to, of protected WINDOWS 10 and WINDOWS 7 systems directly to the Cloud 109 without the need of a backup appliance/aggregator such as a SIRIS, ALTO, or NAS appliance available from DATTO. In some implementations, if protected computing device 103, 104 loses connectivity to the Internet or shuts down in the middle of a backup, the backup agent's 206 intelligent agent software will resume the backup where it left off when the test machine restarts or reconnects. However, this has the drawback that data may be permanently lost if the protected computing device 103, 104 has a system failure during the time period of lost connectivity. The systems and methods described herein address this problem and others.

By way of brief overview, in some exemplary embodiments described herein, Volumes 1 and 2 are designated in memory of the protected computing device 103. The Volumes 1 and 2 are paired to the cloud storage facility 109 using the backup agent 206, so that a backup chain of disk images of the first volume are sent to the cloud storage facility 109 under normal connection conditions, and disk image backups are sent from the second volume upon re-establishing connection subsequent to a connection failure. Background information on backup chains is discussed in U.S. patent application Ser. No. 15/996,103 by Heckel et al., filed Jun. 1, 2018, and entitled "SYSTEMS, METHODS AND COMPUTER READABLE MEDIA FOR BUSINESS CONTINUITY AND DISASTER RECOVERY (BCDR)" which is incorporated by reference herein.

To further explain the backup chain partition, in some exemplary embodiments, the cloud storage facility 109 stores snapshots in a Z File System (ZFS) chain and/or any other suitable form for storing snapshots. The ZFS chain stores data and references to data. For example, assume that the system takes a first snapshot for data blocks A and B at time 0, and a second snapshot for data blocks A, B and C at time 1. For the first snapshot, the cloud storage facility 109 stores data at the data blocks A and B as part of the ZFS chain. For the second snapshot, the cloud storage facility 109 stores references to the data at the data blocks A and B, as well as the data at the data block C, as part of the ZFS chain. In some exemplary embodiments, other snapshotting file systems and mechanisms can be used to capture and store any snapshots, including crash-consistent and finalization snapshots, discussed herein. Other file systems and mechanisms for snapshotting can include or relate to Hammer, ReFS, Btrfs, Write Anywhere File Layout (WAFL), fossil, ODS-5, Unix File System 2 (UFSs), Volume Shadow-copying Service (VSS), Shadow Copy, Melio FS, Novell Storage Services (NSS) file system, file systems of EMC's Isilon OneFS clustered storage platform, Oracle Cluster File System 2 (OCFS2), Journaled File System 2 (JFS2), and/or any other suitable file system or mechanism for snapshotting.

Returning to FIG. 2, after the volumes have been configured on the protected computing device 103, a signal is received to perform a backup to the cloud storage facility. Then it is determined if the connection to the cloud storage facility is available when attempting to start the backup or during the backup process. If the connection is available, a backup of a disk image of the first volume is sent to the cloud storage facility; in the example of FIG. 2, this is shown as Trigger 1 causing Volume 1.1 to be sent to the cloud 109, and Trigger 2 causing Volume 1.2 to be sent to the cloud 109.

If the connection is unavailable, backups of the first volume to the second volume are performed. An example of this is shown in FIG. 2 by triggers 3, 4, . . . , N causing Vol 1.3, 1.4, . . . , 1.N (which may be full, incremental, or differential backups of the first volume) to be stored in Volume 2 of the protected computing device 103. If the connection had been unavailable during copying to the second volume, and subsequently becomes available, the (one or more) backups are moved from the second volume to the cloud storage facility and connected to a backup chain. It should be understood that, in FIG. 2, Vol. 1.i denotes the ith backup of Volume 1. The backups are full, incremental, or differential. The backups into Volume 2 (Vol. 2) are typically incremental due to their smaller size.

Figure 3A:
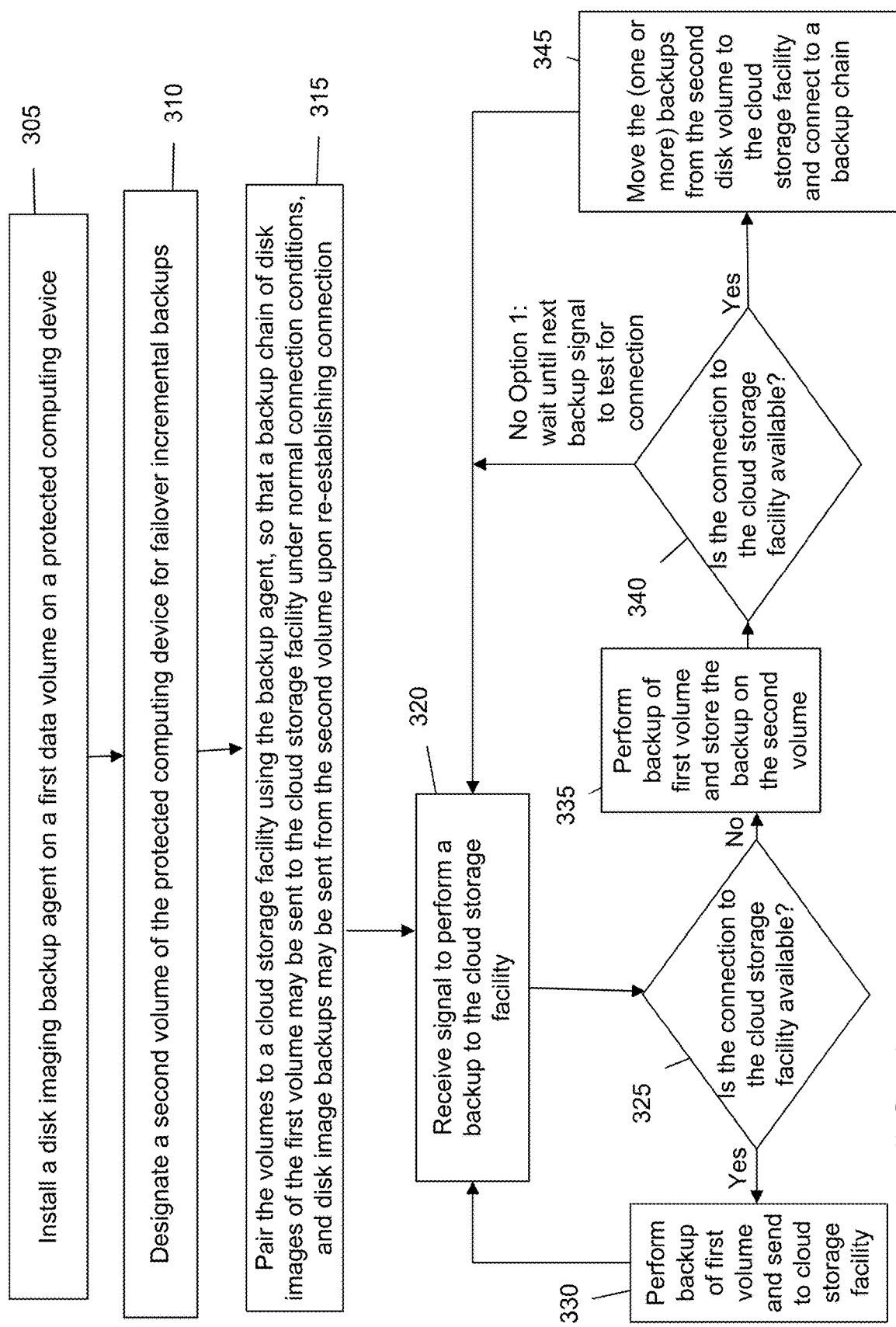
FIG. 3A illustrates a flowchart according to some exemplary embodiments of this disclosure in which, when it is determined that no connection between a protected computing device and a cloud storage facility exists, the system waits for a signal for a next regularly scheduled backup to perform a backup.
Figure 3B:
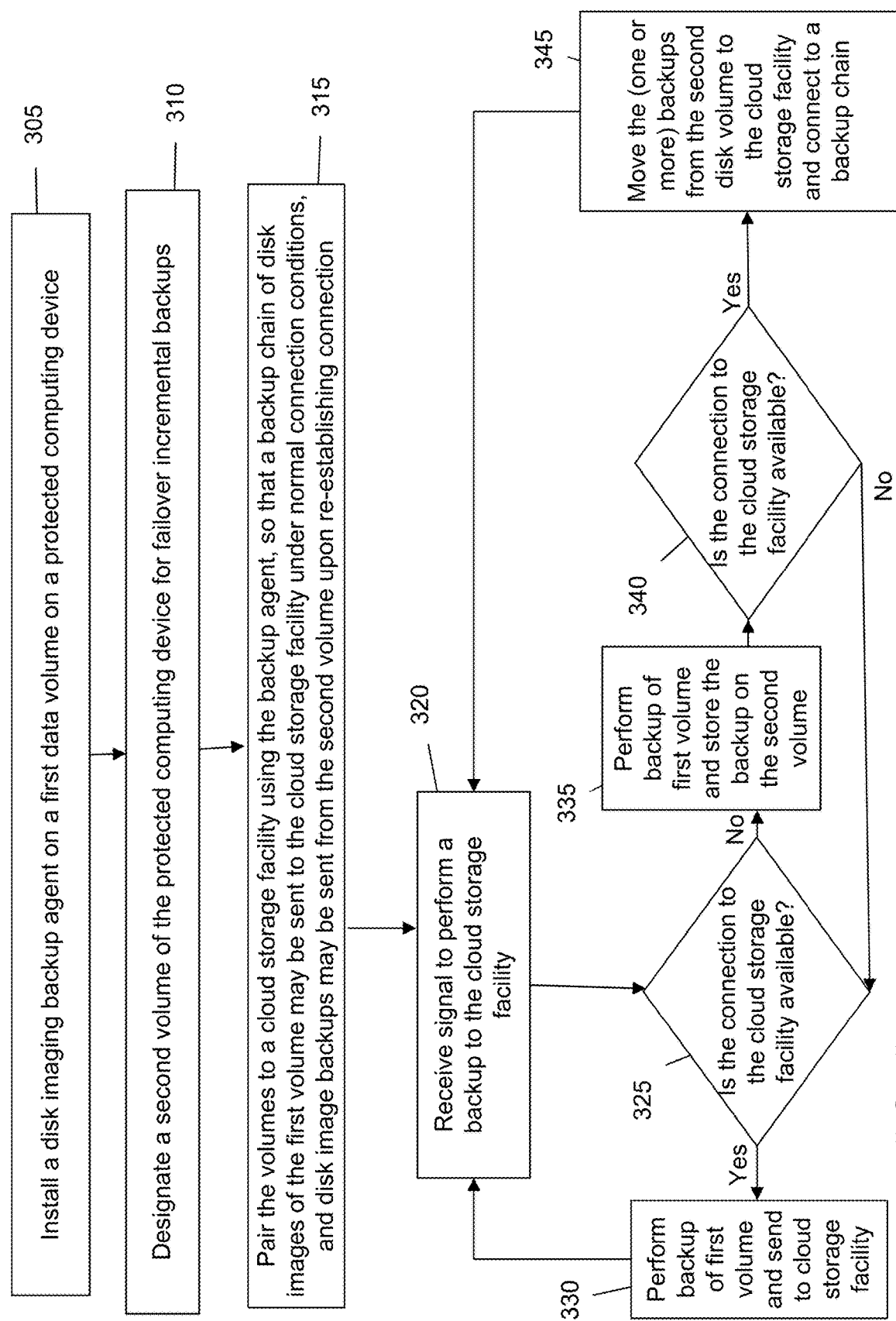
FIG. 3B illustrates a flowchart according to some exemplary embodiments of this disclosure in which a test for connection between a protected computing device and a cloud storage facility is repeated when it is determined that the connection is not available.

To further explain, FIGS. 3A and 3B illustrate a flowchart of an example embodiment. In step 305, a disk imaging backup agent is installed on a first logical volume on a protected computing device (e.g., a server, laptop, client computer, smart phone or so forth). Some embodiments include a virtual machine (VM) operating in a hypervisor where the VM can be set up to have the two volumes. In some embodiments, VMs utilize the hypervisor to store backup changes as files in a datastore, then send those files to the cloud once a connection is established.

The following will further describe the example illustrated in FIGS. 3A and 3B. It should be understood that although FIGS. 3A and 3B refers to incremental backups, full or differential backups may also be used. In step 310, a second logical volume is designated on the protected computing device for failover incremental backups. The backup agent is used to specify the second volume. For example, an identifier for the second volume can be entered by a user into the backup agent or the backup agent can search for a second volume with adequate space to store several incremental backups.

To further explain the logical volumes, a logical volume is a partition that has been formatted into a filesystem. A partition is a space crafted out of a disk. For example, a space of 100 GB could be set aside for a partition from a hard disk of 1 TB. How to partition a hard drive or other memory device is known in the art.

In step 315, volumes are paired to a cloud storage facility using the backup agent, so that a backup chain of disk images of the first volume are sent to the cloud storage facility under normal connection conditions, and disk image backups are sent from the second volume upon re-establishing connection. Pairing is a process used in computer networking that helps set up an initial linkage between computing devices to allow communications between them. Pairing is the first step in connecting two devices. This step is to establish permission that the two devices can communicate with each other. Connection is a step after pairing. This is the state of actively communicating with the device it has previously paired with. Devices can disconnect, but remain paired. Examples of cloud storage providers include or relate to Hammer, ReFS, Btrfs, Write Anywhere File Layout (WAFL), fossil, ODS-5, Unix File System 2 (UFSs), Volume Shadow-copying Service (VSS), Shadow Copy, Melio FS, Novell Storage Services (NSS) file system, file systems of EMC's Isilon OneFS clustered storage platform, Oracle Cluster File System 2 (OCFS2), Journaled File System 2 (JFS2), and/or any other suitable file system or mechanism for snapshotting.

In step 320, a signal to perform a backup to the cloud storage facility is received. The signal could be triggered by any of the example following ways. First, the signal could be triggered by the agent based on a pre-determined schedule. In other words, the signal could be both initiated by the agent and acted upon by the agent. Second, the signal could be triggered by a user. Third, the signal could be triggered automatically due to a certain circumstance such as number of accumulated modifications to the first volume, current low CPU, disk, I/O usage or so forth (the convenience here is that backing up won't slow these processes).

In step 325, it is determined if the connection to the cloud storage facility is available when attempting to start the backup or during the backup process. The following are some example ways to determine that the connection is unavailable. First, a ping test can be used. Second, it is possible to monitor for a check-in signal coming from a backup agent running on the protected computing device.

If the connection is available, in step 330, a disk image (full, differential or incremental) backup is performed and sent to the cloud storage facility. The backup disk image can be the beginning of a backup chain of disk images, or an added step in an existing chain. A full disk image is sent at the beginning of a chain. Background on a backup chain of disk images can be found in U.S. patent application Ser. No. 15/996,103 by Heckel et al., filed Jun. 1, 2018, and entitled "SYSTEMS, METHODS AND COMPUTER READABLE MEDIA FOR BUSINESS CONTINUITY AND DISASTER RECOVERY (BCDR)" which is incorporated by reference herein in its entirety.

If the connection is unavailable, in step 335, an incremental backup of the first volume to the second volume is performed. Is should be noted that in the illustrative examples of FIGS. 3A and 3B, this backup is incremental, although it could also be full or differential instead. In some embodiments, if the second volume has space for a full backup, a full can be copied to the second volume. But, it is likely that the second volume will be smaller than the first volume and the backups will be incremental backups.

If the connection is unavailable at the start of the backup process (performed at step 335), an incremental backup of the first volume disk image is copied to the second volume. If the connection becomes unavailable during the copying of an (e.g., incremental) backup of the first volume disk image to cloud, there are two options for proceeding (not illustrated in FIG. 3A). The first option is to copy the remaining incremental backup to the second volume. The second option is to restart the copying process for this incremental backup and direct it to the second volume.

At step 340, it is again checked if a connection to the cloud storage facility is available. If so, at step 345, the backup(s) are moved from the second volume to the cloud storage facility and connected to a backup chain. If the connection is unavailable, there are two options for proceeding.

Option 1 (illustrated in FIG. 3A) is to loop back to the "receive signal" step to test for connection. If the connection had been unavailable triggering copying to the second volume, and now is available, the (one or more) backups are moved from the second logical volume to the cloud storage facility and connected to a backup chain in the facility. In some embodiments, the incremental backups are deleted from the second volume once they have been copied over because it is undesirable for the second volume to be very large. The copy and delete (move) can occur at this time or be flagged to occur at a convenient time, such as a period of low CPU, disk or I/O activity. Subsequently, the loop of receiving signals and copying backups proceeds.

Option 2 (illustrated in FIG. 3B) is to repeatedly perform a test for connection. If it is determined the connection to the cloud has been re-established, the (one or more) incremental backups are moved from the second disk volume to the cloud storage facility and connected to a backup chain in the cloud storage facility. Backups are deleted as in option 1 because it is undesirable for the second volume to become very large. Subsequently, the loop of receiving signals and copying backups proceeds. If it is determined the connection to the cloud has been not been re-established, testing for connection is continued while continuing the loop of receiving signals, testing connection, and backing up. The time intervals that the test is repeated at may vary. At times of high computer usage, it may be undesirable to test very often due to the test impeding other operations. In this situation, a test every 5 minutes may be warranted. If the test will not impede other operations, it may be performed very frequency, such as every 5 or 10 seconds.

In addition, there are options for storing backups on the second volume (discussed below as options A-E). In this regard, it is desirable to minimize the space required on the second volume. While in principle, full backups can be used, in practice embodiments typically use incremental backups or a form of differential backup.

Figure 4:
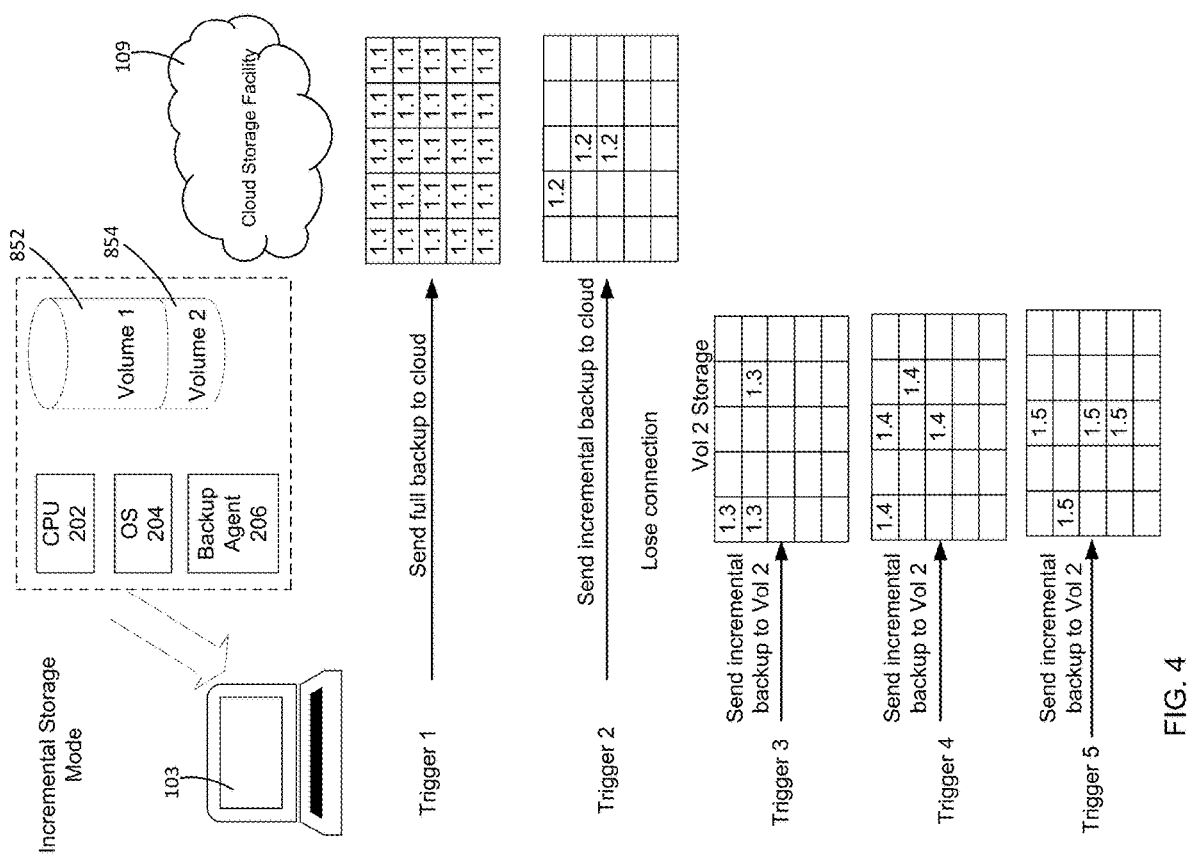
FIG. 4 illustrates an exemplary embodiment including an incremental storage mode with incremental backups stored on Volume 2.

Option A: Store all intermediate backups on the second volume using the nominal schedule (see FIG. 4). To avoid losing data, the size requirement for the second volume must account for all the changes that will occur by the time of each scheduled incremental backup. A size requirement can be estimated through heuristics by knowing the typical size of the incremental backups and having information on disconnect time. Example methods for deriving disconnect time are user input (e.g., known time of travel or planned disconnection) and statistics on prior disconnect times. An issue can occur when the required space for the backups exceeds the available space on the second volume. As illustrated in the exemplary embodiment of FIG. 4, the incremental backups are stored on Volume 2; and, 11 blocks and possible overhead for each image is stored. The 5×5 set of blocks shown in FIG. 4 is merely illustrative and is not intended to literally describe a specific storage system.

Option B: Follow the process of option A, but stop taking incremental backups when the space allocation is exceeded.

Option C: Follow option A, but take incremental backups at an increased time interval compared to the nominal interval used when backing up to the cloud. The interval difference can be a static factor, such as doubling the length of the nominal interval. Alternatively, the interval can be graduated, where the interval lengthens over time as the second volume begins to fill.

Figure 5:
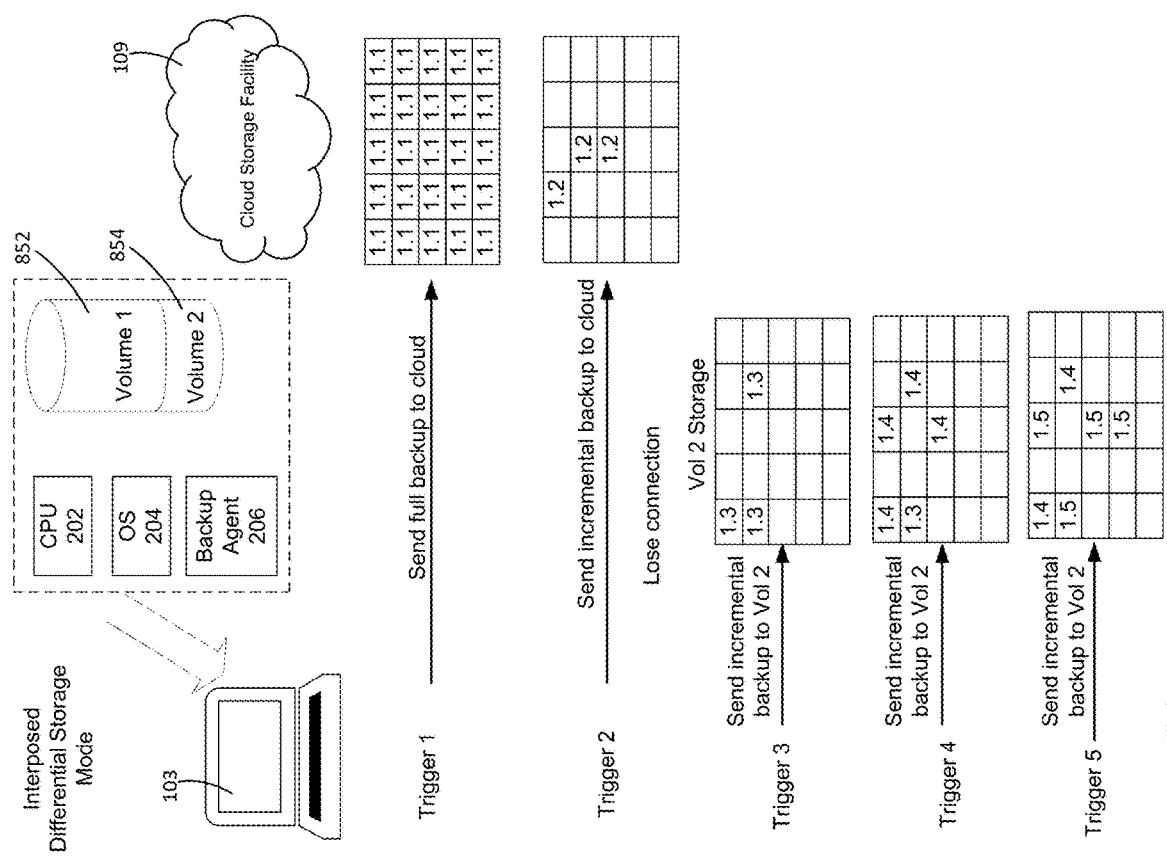
FIG. 5 illustrates an exemplary embodiment including an interposed differential storage mode.

Option D: Merge incremental backups on second volume to create a "interposed differential" backup (see FIG. 5). This option saves space over multiple incremental backups. Usually differentials are from a full. This interposed differential can be the differences from incremental backups that are in the cloud. In the exemplary embodiment of FIG. 5, using Interposed Differential Storage Mode, only the latest differential image is stored on Volume 2; and 6 blocks and possible overhead for one backup image is stored. It should be understood that, in the exemplary embodiment of FIG. 5, using this interposed differential image, the difference is from an incremental image chain rather than a full backup.

A potential issue with Option D is losing information that is in the incremental backups and not in the interposed differential. For instance, the example in FIG. 5 loses several of the Vol 1.3 and Vol 1.4 changes due to being written over by later changes.

Option E: Option A, B or C, combined with Option D. Incremental backups can be taken until space on the second volume becomes a concern. The backup mode can then switch to interposed differential backup. For instance, when the second volume is 50 to 75% full the mode can be switched.

Figure 6:
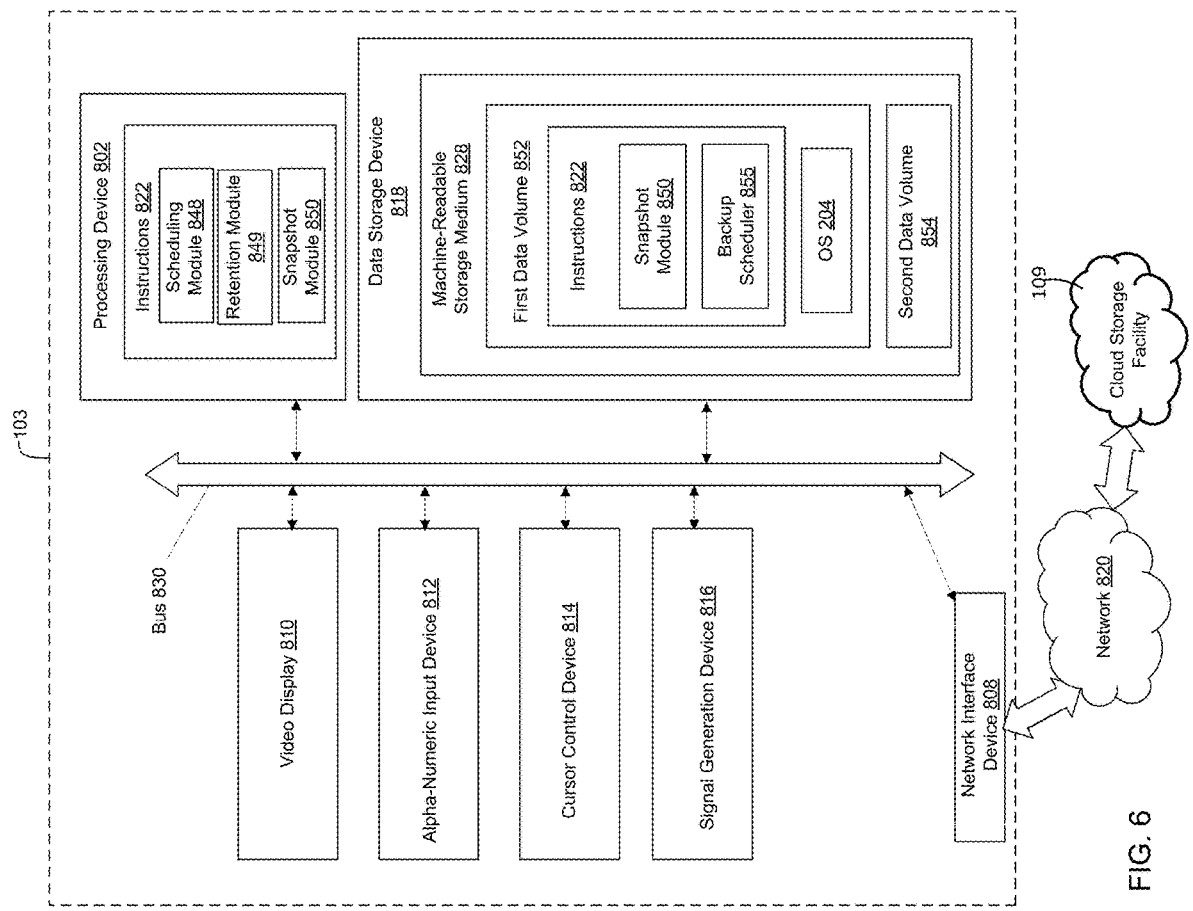
FIG. 6 is an exemplary block diagram of a computer system for performing data backup according to some exemplary embodiments of this disclosure.

FIG. 6 shows a block diagram of a computer system with a set of instructions to perform a backup method according to an embodiment of this disclosure.

With reference to FIG. 6, the protected computing device 103 is, for example, a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any one or more of the methodologies discussed herein.

The example protected computing device 103 includes a processing device 802, and a data storage device 818, which communicate with each other via a bus 830.

Processing device 802 represents one or more general-purpose processing devices such as a microprocessor, a central processing unit, or the like. More particularly, the processing device is a complex instruction set computing (CISC) microprocessor, reduced instruction set computing (RISC) microprocessor, very long instruction word (VLIW)

microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, a graphical processing unit (GPU), or the like. The processing device 802 is configured to execute instructions 822 for performing the operations and steps discussed herein.

The protected computing device 103 further includes a network interface device 808, which may be in communication with cloud storage facility 109 through network 820. The protected computing device 103 also may optionally include a video display unit 810 (e.g., a liquid crystal display (LCD), Light Emitting Diode (LED) monitor, or a cathode ray tube (CRT)), an alphanumeric input device 812 (e.g., a keyboard), a cursor control device 814 (e.g., a mouse), and a signal generation device 816 (e.g., a speaker).

The data storage device 818 includes a machine-readable storage medium 828 (also known as a computer-readable medium) on which is stored one or more sets of instructions 822 or software embodying any one or more of the methodologies or functions described herein. The instructions 822 may also reside, completely or at least partially, within the processing device 802 during execution thereof by the protected computing device 103, and the processing device 802 may also constitute machine-readable storage media. The machine-readable storage medium 828 also includes first data volume 852 and second data volume 854.

In one implementation, the instructions 822 include instructions for a scheduling module 848, retention module 849 and snapshot module 850, and/or a software library containing methods that can be called by the scheduling module 848, retention module 849, the snapshot module 850. The machine-readable storage medium 828 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" accordingly includes, but is not limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulation of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

Figure 7:
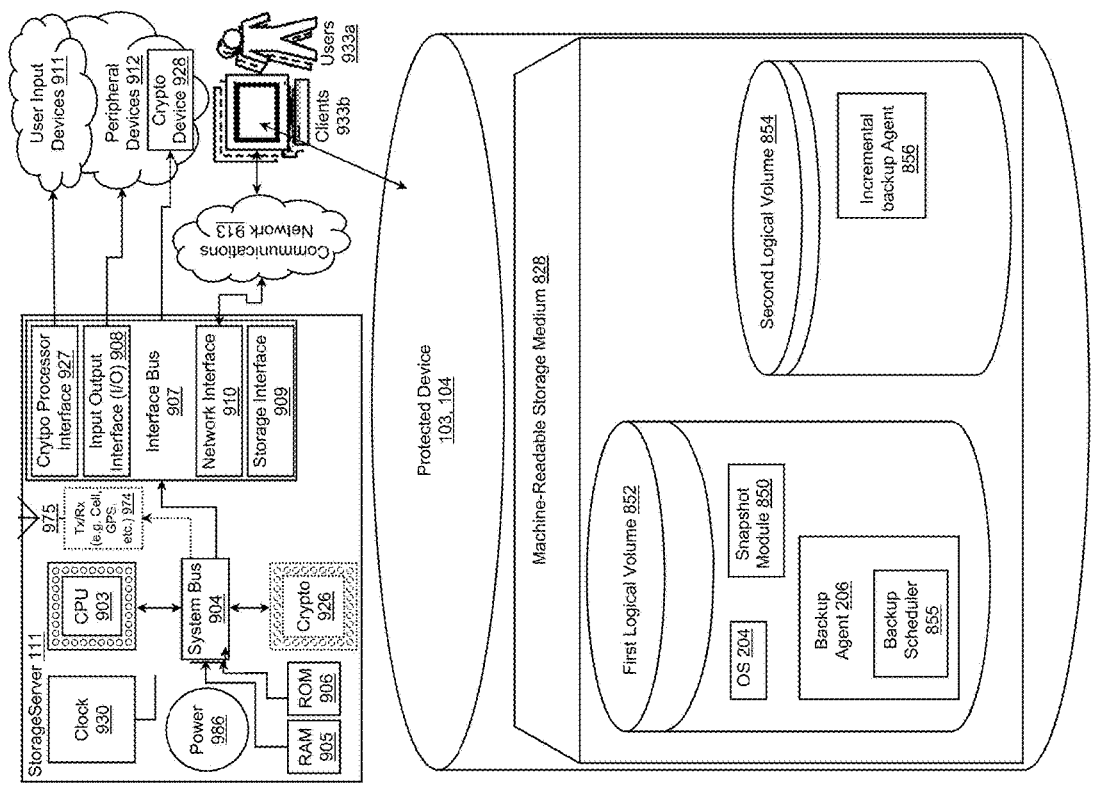
FIG. 7 is a block diagram of a DTC backup network system according to an exemplary embodiment of this disclosure. This exemplary block diagram illustrates hardware and software components of a protected device.

FIG. 7 is a block diagram of a DTC backup network system according to an exemplary embodiment of this disclosure. Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In the exemplary embodiment of FIG. 7, the machine-readable storage medium 928 of the protected device 103, 104 is partitioned into a first logical volume 852 and a second logical volume 854. The first logical volume 852 includes OS 204, backup agent 206, snapshot module 850 and backup scheduler 855. The second logical volume 854 includes incremental backup agent 856 which can, for example, create and store incremental backups of the first logical volume 852.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

In the exemplary embodiment of FIG. 7, StorageServer 111 comprises a clock 930, central processing unit ("CPU(s)" and/or "processor(s)" (these terms are used interchangeable throughout the disclosure unless noted to the contrary)) 903, a memory (e.g., a read only memory (ROM) 906, a random access memory (RAM) 905, etc.), and/or an interface bus 907, and most frequently, although not necessarily, are all interconnected and/or communicating through a system bus 904 on one or more computer systemization (e.g., the storage server 111) having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communication and/or sensor protocols; for example the antenna(s) may connect to: a TEXAS INSTRUMENTS WiLink WL1283 transceiver chip (e.g., providing 902.11n, Bluetooth 3.0, FM, global positioning system (GPS)); BROADCOM BCM4329FKUBG transceiver chip (e.g., providing 902.11 n, Bluetooth 2.1+EDR, FM, etc.); a BROADCOM BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's ATHLON, Duron and/or Opteron; ARM's application, embedded and secure processors; IBM and/or Motorola's DragonBall and PowerPC; IBM's and Sony's Cell processor; Intel's CELERON, Core (2) Duo, Itanium, PENTIUM, XEON, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Should processing requirements dictate a greater amount speed and/or capacity, distributed processors, mainframe, multi-core, parallel, and/or super-computer architectures may similarly be employed. Alternatively, should deployment requirements dictate greater portability, smaller Personal Digital Assistants (PDAs) may be employed.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the system thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the network interface 910 is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers, architectures may similarly be employed to pool, load balance, and/or otherwise increase the communicative bandwidth required. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 912 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, and/or internal. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 928), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: BROADCOM's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Operating System

The operating system 204 is an executable program component facilitating the operation of the protected computing device. Some examples of the operating system 204 include WINDOWS 7 and WINDOWS 10 although it will depend on the type of device (e.g., a smartphone having a different operating system than a laptop or server). Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, MICROSOFT DOS, MICROSOFT Windows 2000/2003/3.1/95/98/CE/Millennium/NT/Vista/XP/Win7 (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like.

Disclosed herein are embodiments including, but not limited to, the following:

[A1] A system for storing computing device backups, the computing device backups being image-based backups configured to be stored at a cloud storage facility comprising at least one storage server, the cloud storage facility configured to form a local backup chain partition of the computing device backups, the system comprising a backup agent on a first logical volume of a protected computing device, the first logical volume comprising an operating system of the protected computing device, the backup agent configured to: designate a second logical volume on the protected computing device; pair the first and second logical volumes to the cloud storage facility; receive a signal to perform a computing device backup of the protected computing device; in response to the received signal, determine if the protected computing device has a communication connection to the cloud storage facility; if the protected computing device does have a communication connection to the cloud storage facility, perform a first computing device backup of the first logical volume including sending the computing device backup to the cloud storage facility; and if the protected computing device does not have a communication connection to the cloud storage facility, perform a second computing device backup of the first logical volume and store the second computing device backup on the second logical volume of the protected computing device, the second computing device backup configured to be merged with the local backup chain partition.

[A2] The system for storing computing device backups according to paragraph [A1], wherein the first computing device backup is a full backup, and the second computing device backup is an incremental computing device backup.

[A3] The system for storing computing device backups according to paragraph [A1], wherein the first computing device backup is a full backup, and the second computing device backup is a differential computing device backup.

[A4] The system for storing computing device backups according to paragraph [A1], wherein the first computing device backup is a full backup, the second computing device backup is an incremental computing device backup, and the backup agent is further configured to: receive a second signal to perform a computing device backup of the protected computing device; if the protected computing device does not have a communication connection to the cloud storage facility, create an interposed differential computing device backup by: performing a third computing device backup, wherein the third computing device backup is an incremental computing device backup, and merging the second and third computing device backups by replacing a memory block of the second computing device backup with a memory block of the third computing device backup.

[A5] The system for storing computing device backups according to paragraph [A1], wherein the determining if the protected computing device has a communication connection to the cloud storage facility is a first determination, and the backup agent is further configured to: make a second determination of if the protected computing device has a communication connection to the cloud storage facility; and if the second determination shows that the protected computing device does not have a communication connection to the cloud storage facility, repeatedly perform a test for a communication connection between the protected computing device and the cloud storage facility.

[A6] The system for storing computing device backups according to paragraph [A1], wherein the determination of if the protected computing device has a communication connection to the cloud storage facility is a first determination, and the backup agent is further configured to: make a second determination of if the protected computing device has a communication connection to the cloud storage facility; and if the second determination shows that the protected computing device does not have a communication connection to the cloud storage facility, wait until a further backup signal is received before performing an additional test to determine if the protected computing device has a communication connection to the cloud storage facility.

[A7] The system for storing computing device backups according to paragraph [A1], wherein the cloud storage facility is further configured to store the second computing device backup by merging the second computing device backup with the local backup chain partition.

[A8] The system for storing computing device backups according to paragraph [A1], wherein the first computing device backup is a full backup, the second computing device backup is an incremental computing device backup, and wherein the backup agent is configured to: subsequent to performing the second computing device backup, perform additional incremental computing device backups with increasing time intervals between the additional incremental computing device backups, wherein the additional incremental backups are configured to be stored on the second logical volume.

[A9] The system for storing computing device backups according to paragraph [A1], wherein the first computing device backup is a full backup, the second computing device backup is an incremental computing device backup, and wherein the backup agent is configured to: subsequent to performing the second computing device backup, perform additional incremental computing device backups and store the additional incremental computing device backups in the second volume; and when the additional incremental backups reach a total memory of between 50-75% of the memory capacity of the second volume: stop performing the additional incremental backups; and start performing interposed differential backups.

[A10] The system for storing computing device backups according to paragraph [A1], wherein the cloud storage facility is configured to store the computing device backups in a Z File System (ZFS) chain.

[A11] The system for storing computing device backups according to paragraph [A1], the first logical volume further comprising a scheduling agent operatively installed on the first logical volume and configured to schedule the computing device backups.

[A12] A processor implemented method for storing computing device backups of a protected computing device, the computing device backups being image-based backups, the protected computing device comprising a first logical volume and a second logical volume, the first logical volume comprising an operating system of the protected computing device, the computing device backups configured to be stored at a cloud storage facility comprising at least one storage server, the cloud storage facility configured to form a local backup chain partition of the computing device backups, the method comprising: pairing the first and second logical volumes to the cloud storage facility; receiving a signal to perform a computing device backup of the protected computing device; determining that the protected computing device does not have a communication connection to the cloud storage facility; in response to the determination that the protected computing device does not have a communication connection to the cloud storage facility, performing a computing device backup of the first logical volume and storing the computing device backup on the second logical volume of the protected computing device; determining that the protected computing device does have a communication connection to the cloud storage facility; and in response to the determination that the protected computing device does have a communication connection to the cloud storage facility, sending the computing device backup to the cloud storage facility to merge with the local backup chain partition.

[A13] The processor implemented method for storing computing device backups of a protected computing device according to paragraph [A12], wherein the determining that the protected computing device does not have a communication connection to the cloud storage facility is done according to a ping test.

[A14] A processor implemented method for storing computing device backups of a protected computing device according to paragraph [A12], wherein the determining that the protected computing device does not have a communication connection to the cloud storage facility is done by monitoring for a check-in signal from a backup agent of the protected computing device.

[A15] The processor implemented method for storing computing device backups of a protected computing device according to paragraph [A12], wherein the computing device backup is an incremental computing device backup.

[A16] The processor implemented method for storing computing device backups of a protected computing device according to paragraph [A12], wherein the computing device backup is a differential computing device backup.

[A17] The processor implemented method for storing computing device backups of a protected computing device according to paragraph [A12], wherein the computing device backup is a first incremental computing device backup, and the method further comprises: receiving a second signal to perform a computing device backup of the protected computing device; making a further determination that the protected computing device does not have a communication connection to the cloud storage facility; and in response to the further determination that the protected computing device does not have a communication connection to the cloud storage facility, creating an interposed differential computing device backup by: performing a second incremental computing device backup, and merging the first and second incremental computing device backups by replacing a memory block of the first incremental computing device backup with a memory block of the second computing device backup.

[A18] The processor implemented method for storing computing device backups of a protected computing device according to paragraph [A12], wherein the determination that the protected computing device does not have a communication connection to the cloud storage facility is a first determination, and the method further comprises: making a second determination that the protected computing device does not have a communication connection to the cloud storage facility; and in response to the second determination that the protected computing device does not have a communication connection to the cloud storage facility, repeatedly perform a test for a communication connection between the protected computing device and the cloud storage facility.

[A19] The processor implemented method for storing computing device backups of a protected computing device according to paragraph [A12], wherein the determination that the protected computing device does not have a communication connection to the cloud storage facility is a first determination, and the method further comprises: making a second determination that the protected computing device does not have a communication connection to the cloud storage facility; and in response to the second determination that the protected computing device does not have a communication connection to the cloud storage facility, waiting until a further backup signal is received before performing an additional test to determine if the protected computing device has a communication connection to the cloud storage facility.

[A20] The processor implemented method for storing computing device backups of a protected computing device according to paragraph [A12], wherein the second computing device backup is an incremental computing device backup, and wherein the method further comprises: subsequent to performing the computing device backup, performing additional incremental backups with increasing time intervals between the additional incremental backups.

[A21] A protected computing device comprising: at least one processor; and at least one memory including computing program code; the at least one memory and the computing program code configured to, with the at least one processor, cause the protected computing device to: pair first and second logical volumes of the protected computing device to a cloud storage facility, wherein the first logical volume comprises an operating system of the protected computing device; receive a signal to perform a computing device backup of the protected computing device; in response to the received signal, determine if the protected computing device has a communication connection to the cloud storage facility; if the protected computing device does have a communication connection to the cloud storage facility, perform a first computing device backup of the first logical volume and send the computing device backup to the cloud storage facility; and if the protected computing device does not have a communication connection to the cloud storage facility, perform a second computing device backup of the first logical volume and store the second computing device backup on the second logical volume of the protected computing device; wherein the cloud storage facility is configured to form a local backup chain partition of the computing device backups.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments also relate to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, many embodiments are not described with reference to any particular programming language. It will be appreciated that a variety of programming languages may be used to implement the teachings of many embodiments as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A direct-to-cloud backup with local volume failover system for storing computing device backups, the computing device backups being image-based backups configured to be stored at a cloud storage facility comprising at least one storage server, the cloud storage facility configured to form a local backup chain partition of the computing device backups, the system comprising a backup agent on a first logical volume of a protected computing device, the first logical volume comprising an operating system of the protected computing device, the backup agent configured to:
   estimate a size for a second logical volume based on a typical size of a backup and an expected disconnect time of the first logical volume;
   designate the second logical volume within a memory of the protected computing device based on the estimated size for the second logical volume, wherein the first logical volume and the second logical volume are both stored in the memory of the protected computing device;
   pair the first and second logical volumes to the cloud storage facility;
   receive a signal to perform a computing device backup of the protected computing device;
   in response to the received signal, determine if the protected computing device has a communication connection to the cloud storage facility; and
   if the protected computing device does not have a communication connection to the cloud storage facility, perform a second computing device backup of the first logical volume and store the second computing device backup on the second logical volume of the protected computing device, the second computing device backup configured to be merged with the cloud storage facility local backup chain partition and subsequently deleted from the second logical volume after merging and based on activity on the protected computing device, the cloud storage facility local backup chain partition including a previously sent first computing device backup of the first logical volume and the merge occurring after the communication connection to the cloud storage facility is reestablished, and the merge occurring prior to performing a subsequent first computing device backup of the first logical volume to the cloud storage facility local backup chain partition after the communication connection to the cloud storage facility is reestablished;
   wherein the first computing device backup is a full backup, and the second computing device backup is an incremental computing device backup comprising copies of data that had been modified since the first computing device backup, which is determined based on a comparison of a modified time stamp on files and a time stamp of the first computing device backup.

2. The system for storing computing device backups according to claim 1, wherein the backup agent is further configured to:
- receive a second signal to perform a computing device backup of the protected computing device;
- if the protected computing device does not have a communication connection to the cloud storage facility, create an interposed differential computing device backup by:
  - performing a third computing device backup, wherein the third computing device backup is an incremental computing device backup; and
  - merging the second and third computing device backups by replacing a memory block of the second computing device backup with a memory block of the third computing device backup.

3. The system for storing computing device backups according to claim 1, wherein the determining if the protected computing device has a communication connection to the cloud storage facility is a first determination, and the backup agent is further configured to:
- make a second determination of if the protected computing device has a communication connection to the cloud storage facility; and
- if the second determination shows that the protected computing device does not have a communication connection to the cloud storage facility, repeatedly perform a test for a communication connection between the protected computing device and the cloud storage facility.

4. The system for storing computing device backups according to claim 1, wherein the determination of if the protected computing device has a communication connection to the cloud storage facility is a first determination, and the backup agent is further configured to:
- make a second determination of if the protected computing device has a communication connection to the cloud storage facility; and
- if the second determination shows that the protected computing device does not have a communication connection to the cloud storage facility, wait until a further backup signal is received before performing an additional test to determine if the protected computing device has a communication connection to the cloud storage facility.

5. The system for storing computing device backups according to claim 1, wherein the backup agent is configured to:
- subsequent to performing the second computing device backup, perform additional incremental computing device backups with increasing time intervals between the additional incremental computing device backups, wherein the additional incremental backups are configured to be stored on the second logical volume.

6. The system for storing computing device backups according to claim 1, wherein the backup agent is configured to:
- subsequent to performing the second computing device backup, perform additional incremental computing device backups and store the additional incremental computing device backups in the second volume; and
- when the additional incremental backups reach a total memory of between 50-75% of the memory capacity of the second volume:
  - stop performing the additional incremental backups; and
  - start performing interposed differential backups.

7. The system for storing computing device backups according to claim 1, wherein the cloud storage facility is configured to store the computing device backups in a Z File System (ZFS) chain.

8. The system for storing computing device backups according to claim 1, the first logical volume further comprising a scheduling agent operatively installed on the first logical volume and configured to schedule the computing device backups.

9. A processor implemented direct-to-cloud backup with local volume failover method for storing computing device backups of a protected computing device, the computing device backups being image-based backups, the protected computing device comprising a first logical volume and a second logical volume, the first logical volume comprising an operating system of the protected computing device, the computing device backups configured to be stored at a cloud storage facility comprising at least one storage server, the cloud storage facility configured to form a local backup chain partition of the computing device backups, the method comprising:
- pairing the first and second logical volumes to the cloud storage facility;
- receiving a signal to perform a computing device backup of the protected computing device, the signal being triggered based on activity of a central processing unit of the protected computing device being low;
- determining that the protected computing device does not have a communication connection to the cloud storage facility;
- in response to the determination that the protected computing device does not have a communication connection to the cloud storage facility;
  - performing a computing device backup of the first logical volume;
  - performing additional incremental computing device backups with graduated increasing time intervals between the additional incremental computing device backups; and
  - storing the computing device backup and the additional incremental computing device backups on the second logical volume of the protected computing device;
- determining that the protected computing device does have a communication connection to the cloud storage facility;
- in response to the determination that the protected computing device does have a communication connection to the cloud storage facility, sending the computing device backup and the additional incremental computing device backups to the cloud storage facility to merge with the local backup chain partition and subsequently deleting the computing device backup from the second logical volume after merging, the local backup chain partition including a previously sent computing device backup of the first logical volume and the merge occurring after the communication connection to the cloud storage facility is reestablished, and the merge occurring prior to performing a subsequent computing device backup of the first logical volume to the computing device backup to the cloud storage facility local backup chain partition after the communication connection to the cloud storage facility is reestablished;
- determining that the protected computing device loses the communication connection to the cloud storage facility while sending the computing device backup and the additional incremental computing device backups to the cloud storage facility; and in response to the determination that the protected computing device loses the communication connection to the cloud storage facility while sending the computing device backup and the additional incremental device backups to the cloud storage facility, storing a remaining portion of the computing device backup and the additional incremental device backups on the second logical volume of the protected computing device.

10. The processor implemented method for storing computing device backups of a protected computing device according to claim 9, wherein the determining that the protected computing device does not have a communication connection to the cloud storage facility is done according to a ping test.

11. A processor implemented method for storing computing device backups of a protected computing device according to claim 9, wherein the determining that the protected computing device does not have a communication connection to the cloud storage facility is done by monitoring for a check-in signal from a backup agent of the protected computing device.

12. The processor implemented method for storing computing device backups of a protected computing device according to claim 9, wherein the computing device backup is an incremental computing device backup.

13. The processor implemented method for storing computing device backups of a protected computing device according to claim 9, wherein the computing device backup is a differential computing device backup.

14. The processor implemented method for storing computing device backups of a protected computing device according to claim 9, wherein the computing device backup is a first incremental computing device backup, and the method further comprises:

receiving a second signal to perform a computing device backup of the protected computing device;

making a further determination that the protected computing device does not have a communication connection to the cloud storage facility; and in response to the further determination that the protected computing device does not have a communication connection to the cloud storage facility, creating an interposed differential computing device backup by:

performing a second incremental computing device backup, and merging the first and second incremental computing device backups by replacing a memory block of the first incremental computing device backup with a memory block of the second computing device backup.

15. The processor implemented method for storing computing device backups of a protected computing device according to claim 9, wherein the determination that the protected computing device does not have a communication connection to the cloud storage facility is a first determination, and the method further comprises:

making a second determination that the protected computing device does not have a communication connection to the cloud storage facility; and in response to the second determination that the protected computing device does not have a communication connection to the cloud storage facility, repeatedly perform a test for a communication connection between the protected computing device and the cloud storage facility.

16. The processor implemented method for storing computing device backups of a protected computing device according to claim 9, wherein the determination that the protected computing device does not have a communication connection to the cloud storage facility is a first determination, and the method further comprises:

making a second determination that the protected computing device does not have a communication connection to the cloud storage facility; and in response to the second determination that the protected computing device does not have a communication connection to the cloud storage facility, waiting until a further backup signal is received before performing an additional test to determine if the protected computing device has a communication connection to the cloud storage facility.

17. A direct-to-cloud backup with local volume failover protected computing device comprising:

at least one processor;

and at least one memory including computing program code;

the at least one memory and the computing program code configured to, with the at least one processor, cause the protected computing device to:

estimate a size for a second logical volume based on a typical size of a backup and an expected disconnect time of a first logical volume;

designate the second logical volume within the at least one memory of the protected computing device based on the estimated size for the second logical volume;

pair the first logical volume and the second logical volume of the protected computing device to a cloud storage facility, wherein the first logical volume comprises an operating system of the protected computing device;

receive a signal to perform a computing device backup of the protected computing device, the signal being triggered based on activity of a central processing unit of the protected computing device being low;

in response to the received signal, determine if the protected computing device has a communication connection to the cloud storage facility;

if the protected computing device does have a communication connection to the cloud storage facility, perform a first computing device backup of the first logical volume and send the first computing device backup of the first logical drive to the cloud storage facility; and if the protected computing device does not have a communication connection to the cloud storage facility;

perform a second computing device backup of the first logical volume;

perform additional incremental computing device backups with graduated increasing time intervals between the additional incremental computing device backups; and store the second computing device backup and the additional incremental computing device backups on the second logical volume of the protected computing device, the second computing device backup and the additional incremental computing device backups configured to be merged with a cloud storage facility local backup chain partition and subsequently deleted from the second logical volume after merging and based on activity on the protected computing device, the cloud storage facility local backup chain partition including a previously sent first computing device backup of the first logical volume and the merge occurring after the communication connection to the cloud storage facility is reestablished and the merge occurring prior to performing a subsequent first computing device backup of the first logical volume to the cloud storage facility local backup chain partition after the communication connection to the cloud storage facility is reestablished; and if the protected computing device loses the communication connection to the cloud storage facility while sending the first computing device backup to the cloud storage facility, store a remaining portion of the first computing device backup of the first logical drive on the second logical volume of the protected computing device.

* * * * *